United States Patent

[11] 3,622,243

[72] Inventor Akiyoshi Wada
 Tokyo, Japan
[21] Appl. No. 874,371
[22] Filed Nov. 6, 1969
[45] Patented Nov. 23, 1971
[73] Assignee Shimadzu Seisakusho Ltd.
 Nakagyo-ku, Kyoto, Japan
[32] Priority Nov. 9, 1968
[33] Japan
[31] 43/82078

[54] LIGHT SCATTERING SPECTROPHOTOMETER WITH VIBRATING EXIT SLIP
 5 Claims, 11 Drawing Figs.
[52] U.S. Cl. ................................................. 356/75
[51] Int. Cl. ................................................. G01j 3/44
[50] Field of Search ......................................... 356/75, 106 IS

[56] References Cited
UNITED STATES PATENTS
2,527,122 10/1950 Heigl et al. ................. 356/75
3,286,582 11/1966 Mertz ....................... 356/106 IS OTHER REFERENCES
Interferometric Raman Spectroscopy Using Infra-Red Excitation; Chantry et al.; Nature; Vol. 203 04949 Sept. 5, 1964; pg. 1052 & 1053

Principles of Self-Modulating Derivative Optical Spectroscopy; Applied Optics; Vol. 3 #12 Dec. 1964; pg. 1417–1424

Primary Examiner—Ronald L. Wibert
Assistant Examiner—V. P. McGraw
Attorney—Fidelman, Wolffe and Leitner ABSTRACT: A spectrophotometer for measuring Raman and Brillouin spectra of the light scattered from a sample. The spectrophotometer of the invention comprises a monochromatic light source, a sample cell into which the monochromatic light is projected so as to be scattered by the sample, and a monochromator for dispersing the light scattered by the sample. The wavelength of the output light from the monochromator is periodically changed at a predetermined frequency by vibrating the exit slit of the monochromator. The periodically changing output light signal is converted to a corresponding electrical signal, which is Fourier decomposed. The Fourier decomposition makes it possible to distinguish the Raman and Brillouin components of the scattered light from the other components such as the exciting or incident light and stray light.

PATENTED NOV 23 1971 3,622,243
SHEET 1 OF 2
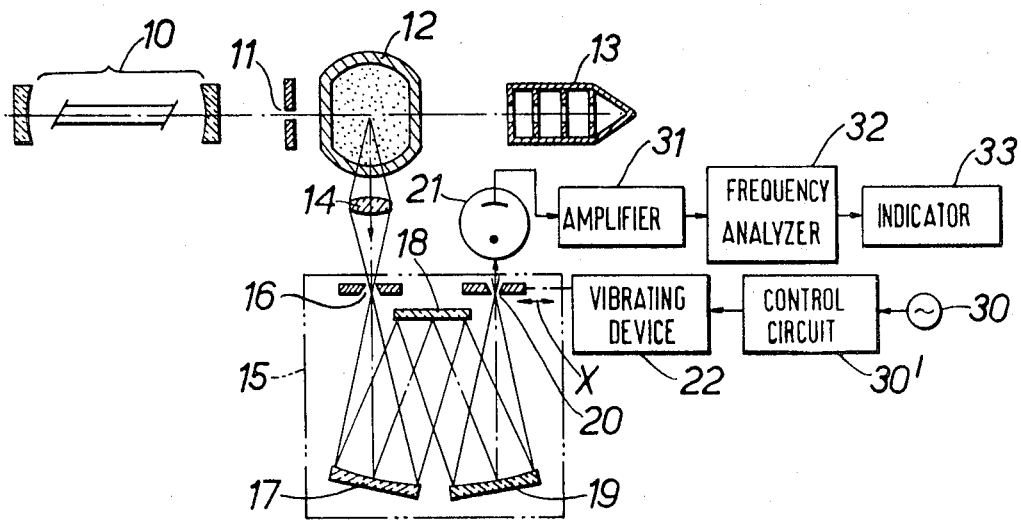
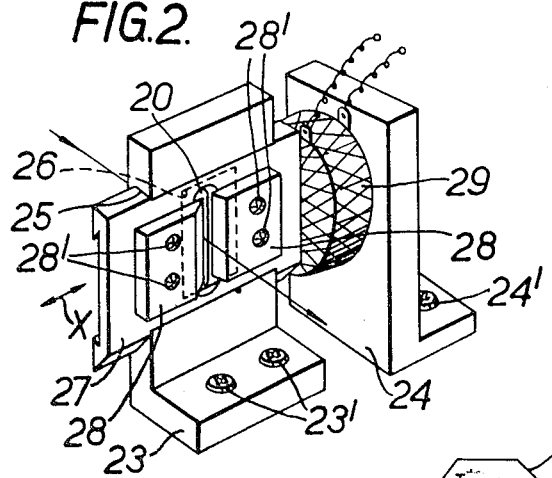
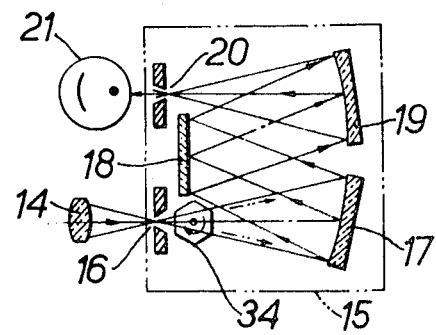
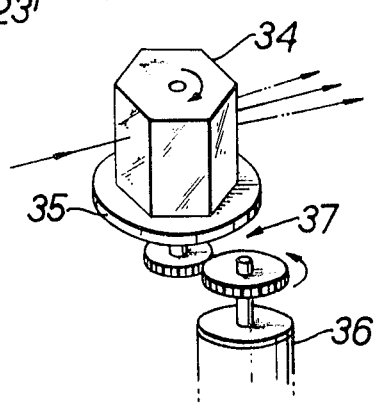

LIGHT SCATTERING SPECTROPHOTOMETER WITH VIBRATING EXIT SLIP

This invention relates to a light scattering spectrophotometer and more particularly, to a spectrophotometer for measuring the spectrum of the light scattered, such as Raman or Brillouin scattered light, from a sample illuminated by monochromatic light.

As is well known, when a beam of monochromatic light such as a laser beam is passed through a high polymer solution, the light is scattered by the molecules in the solution. The spectrum of the scattered light contains not only the Rayleigh component having the same wavelength as that of the incident or exciting light but also weak scattered light such as the Raman or Brillouin component having a wavelength shifted from the Rayleigh component in accordance with the molecular vibration of the high polymer. The broadening of the spectrum of the scattered light is a function of the degree of freedom of internal movement of the high polymer. With a spectrometer having a high resolving power, it would be possible to distinguish those minute peaks of the spectrum which could otherwise not be detected, thereby obtaining a detailed and accurate information of the internal structure of the high polymer. In some cases, however, it would not be necessary to distinguish between each of the minute spectral lines of the scattered light from the others adjacent to the spectral line of the exciting beam, but to measure the shape of the spectrum of the scattered light at the sacrifice of the resolving power.

With a conventional prism or gating spectrometer, it may be possible to draw a rough sketch of the spectrum of the light scattered from a sample. However, it is quite impossible to accurately measure the spectrum because of the influence by the exciting light and/or stray light.

Accordingly, the primary object of the invention is to provide a light scattering spectrophotometer which is capable of accurately measuring the shape of the spectrum of Raman or Brillouin scattered light from a sample illuminated by monochromatic light. The device of the invention comprises a monochromatic light source, a sample cell into which the monochromatic light is projected so as to be scattered by the sample therein, a monochromator for dispersing the scattered light from the sample, and photoelectric means for converting the output light from the monochromator into a corresponding electrical signal. Characteristic of the invention is that the wavelength of the output light from the monochromator is periodically oscillated and the corresponding electrical signal is Fourier decomposed so as to measure the frequency distribution of the electrical signal. In order to periodically change the wavelength of the output light the exit slit of the monochromator is vibrated in the direction of dispersion of the scattered light to an extent wider than the spectral range of the scattered light. Fourier decomposition may be performed by any suitable frequency analyzer. By Fourier decomposition of the periodically changing electrical signal it is possible to easily distinguish the Raman and Brillouin components having relatively low frequencies from the component caused by the incident laser light and having a very high frequency or the component caused by stray light and having zero frequency.

The invention will be described in further detail with reference to the accompanying drawing, wherein like reference numerals denote like parts, and wherein;

FIG. 1 is a schematic diagram illustrating one embodiment of the invention;

FIG. 2 is a perspective view of one form of the exit slit vibrating means of the monochromator of FIG. 1;

FIG. 3 is a schematic view of part of another embodiment of the invention, in which the image of the entrance slit of the monochromator is periodically and reciprocally moved instead of vibrating the exit slit in the embodiment of FIG. 1;

FIG. 4 is a perspective view of the image moving means in FIG. 3;

Figure 5A:
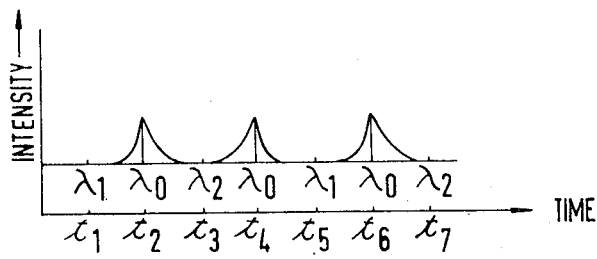
FIGS. 5a to 5e show various graphs illustrating the operation of the device of the invention.

Referring now in detail to the drawing, first to FIG. 1, there is shown a source 10 of monochromatic light having a very sharp spectral line such as a laser and most preferably a gas laser. The laser output light passes through a pinhole 11 to enter a cell 12 containing a sample to be analyzed such as a high polymer solution. When the light enters the solution, part of it is transmitted directly therethrough into a trap 13 to be absorbed therein, while the other part of the incident light is scattered by the molecules in the high polymer solution in different directions. The scattered light emerging from the cell 12 is collected by a lens 14 and enters a monochromator generally designated by 15. The light entering the device 15 passes through an entrance slit 16 and is reflected by a collimating mirror 17 and then dispersed by a grating 18, which may be replaced by a prism. The dispersed light is reflected by another collimating mirror 19 so as to focus the image of the entrance slit at an exit slit 20. The output light from the slit 20 is received by a photomultiplier tube 21.

One of the most important features of the invention is that the exit slit 20 is periodically vibrated by a vibrating device 22 in the direction x of dispersion of the scattered light within a predetermined range of wavelength. One preferred form of the vibrating device is shown in FIG. 2 comprising a pair of upstanding support members 23 and 24 rigidly fixed as at 23' and 24', respectively, to the casing of the monochromator, not shown. The support member 23 is formed with a guide groove 25 extending transversely of the member 23 with a window 26 therein. A plate 27 slidably engages in the groove 25 and has a pair of blades 28 secured thereto as at 28' so as to define the exit slit 20 therebetween. The support member 24 carries a moving coil 29, to which one end of the plate 27 is secured so that upon energization of the coil 29 from a suitably alternating current source 30 through a control circuit 30', the coil 29 vibrates and consequently the plate 27 with its slit 20 reciprocates in the groove 25 at a frequency as determined by the frequency of the source 30. The waveform of the vibration of the slit 20 may be sinusoidal provided that the width of the spectrum of the scattered light is narrower than the amplitude of the vibration of the slit 20. If desired, however, it may of any other suitably waveform, such as triangle or saw-teeth.

Figure 5B:
Figure 5C:
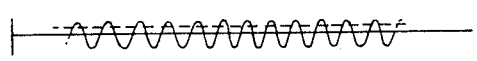
Figure 5D:
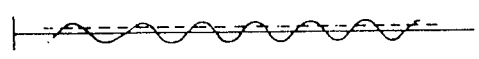
Figure 5E:
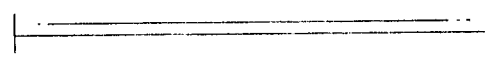
Figure 6:
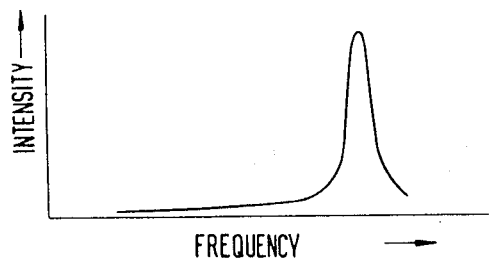
FIG. 6 shows a frequency spectrum as obtained by the frequency analyzer in FIG. 1.
Figure 7:
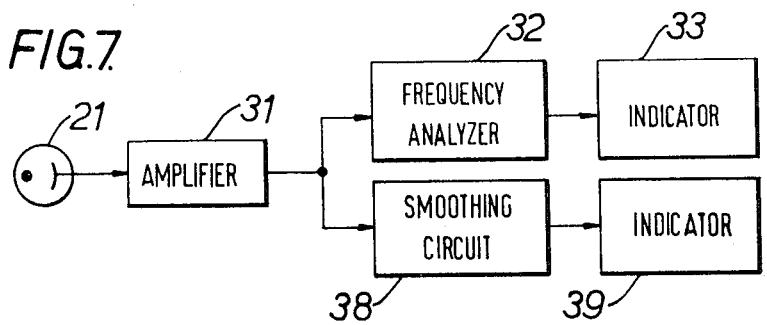
FIG. 7 is a block diagram of the electrical portion of another embodiment of the invention.

It will be easily seen that the light proceeding toward the exit slit 20 has a spatial intensity distribution corresponding in shape to the intensity distribution of the spectrum of the scattered light from the sample solution. Suppose that the exit slit 20 is vibrated at a predetermined frequency within the wavelength range between λ1 and λ2 with λo of the incident light (the Rayleigh component) as the center of vibration, the vibration range being sufficiently wider than the width of the spectrum of the scattered light. As shown in FIG. 5a, as time goes on from t1, t2, ..., t7, ..., the output from the exit slit 20 changes in wavelength and intensity, and the corresponding electrical output signal from the photomultiplier 21 accordingly changes. The signal is amplified by an amplifier 31 and then applied to a frequency analyzer 32 to be Fourier decomposed into different frequency components as shown in FIGS. 5b to 5e. These components are shown only by way of example, and in reality there are more components included in the signal. It is seen that the Raman and Brillouin components having relatively low frequencies as shown in FIG. 5c or 5d can be easily distinguished from the Rayleigh component caused by the exciting laser light having a very high frequency as shown in FIG. 5b and from the stray light appearing as a direct current component having zero frequency as shown in FIG. 5d. The result of the frequency analysis is indicated as a frequency spectrum as shown in FIG. 6 by a suitable indicator 33 such as a cathode-ray tube or recorder. In FIG. 5b–5d the dotted lines show the respective components as smoothed and rectified.

In the arrangement of FIG. 1, the exit slit 20 is vibrated to obtain a periodically changing output light signal. The same result may also be obtained by periodically and reciprocally moving the image of the entrance slit of the monochromator transversely of the exit slit, as shown in FIGS. 3 and 4. Just inside the entrance slit 16 there is provided in the optical path of the monochromator a rotary glass block 34 having a polygonal, say, hexagonal transverse cross section with its axis of rotation perpendicular to the horizontal plane including the optical axis. The block 34 is fixedly mounted on a disk 35 which is rotated by a motor 36 through a gear train 37. It will be easily seen that as the block 34 is rotated about its axis, the image of the entrance slit 16 is reciprocated transversely of the exit slit 20 with the same result as when the exit slit is vibrated transversely of the image of the entrance slit in FIG. 1.

The output from the amplifier 31 may also be applied to a smoothing circuit 38 having a response suitable to measure the shape of the spectrum of the scattered light. The output from the circuit 38 is applied to a suitable indicator 39. The indication shows the shape of spectrum of the scattered light.

Thus in accordance with the invention, it is possible to eliminate errors due to the stray light uniformly existing around the exit slit of the monochromator, and the Fourier component caused by the incident light, if it should be mixed with the scattered light, has so high a frequency that it can be substantially cut off from the Raman or Brillouin component having a relatively low frequency, so that very accurate measurement can be achieved.

What I claim is:

1. A spectrophotometer for measuring Raman or Brillouin scattered light from a sample, comprising:
a source of monochromatic light; a cell for containing a sample to be analyzed and disposed in the path of said monochromatic light; a monochromator disposed in the path of the light scattered from said sample and including means for reciprocally changing the wavelength of the output light from said monochromator; means for converting said reciprocally changing output light to a corresponding electrical signal; means for Fourier decomposing said electrical signal; and means for indicating the result of said Fourier decomposition, and further including means for smoothing said electrical signal and means for indicating said signal to see the shape of the spectrum of said scattered light.

2. The spectrophotometer of claim 1, wherein said monochromator includes an entrance slit, an exit slit and means for dispersing said scattered light from said sample, and said wavelength changing means comprises means for vibrating said exit slit at a predetermined frequency across a wavelength range wider than the spectral distribution of said scattered light.

3. The spectrophotometer of claim 1, wherein said monochromator includes an entrance slit, an exit slit and means for dispersing said scattered light from said sample, and save wavelength changing means comprises means for reciprocally moving the image of said entrance slit transversely of said exit slit.

4. The spectrophotometer of claim 1, wherein said Fourier decomposing means is a frequency analyzer.

5. The spectrophotometer of claim 1, wherein said monochromatic light source is a laser.

* * * * *